April 17, 1928.  
F. E. McCABE  
1,666,578  
AUTOMATIC CONTROL FOR THE RAMMING HEADS OF MOLDING MACHINES  
Filed Feb. 5, 1926  4 Sheets-Sheet 1

Inventor  
Frank E. McCabe  
By Hull, Brock & West  
Attys.

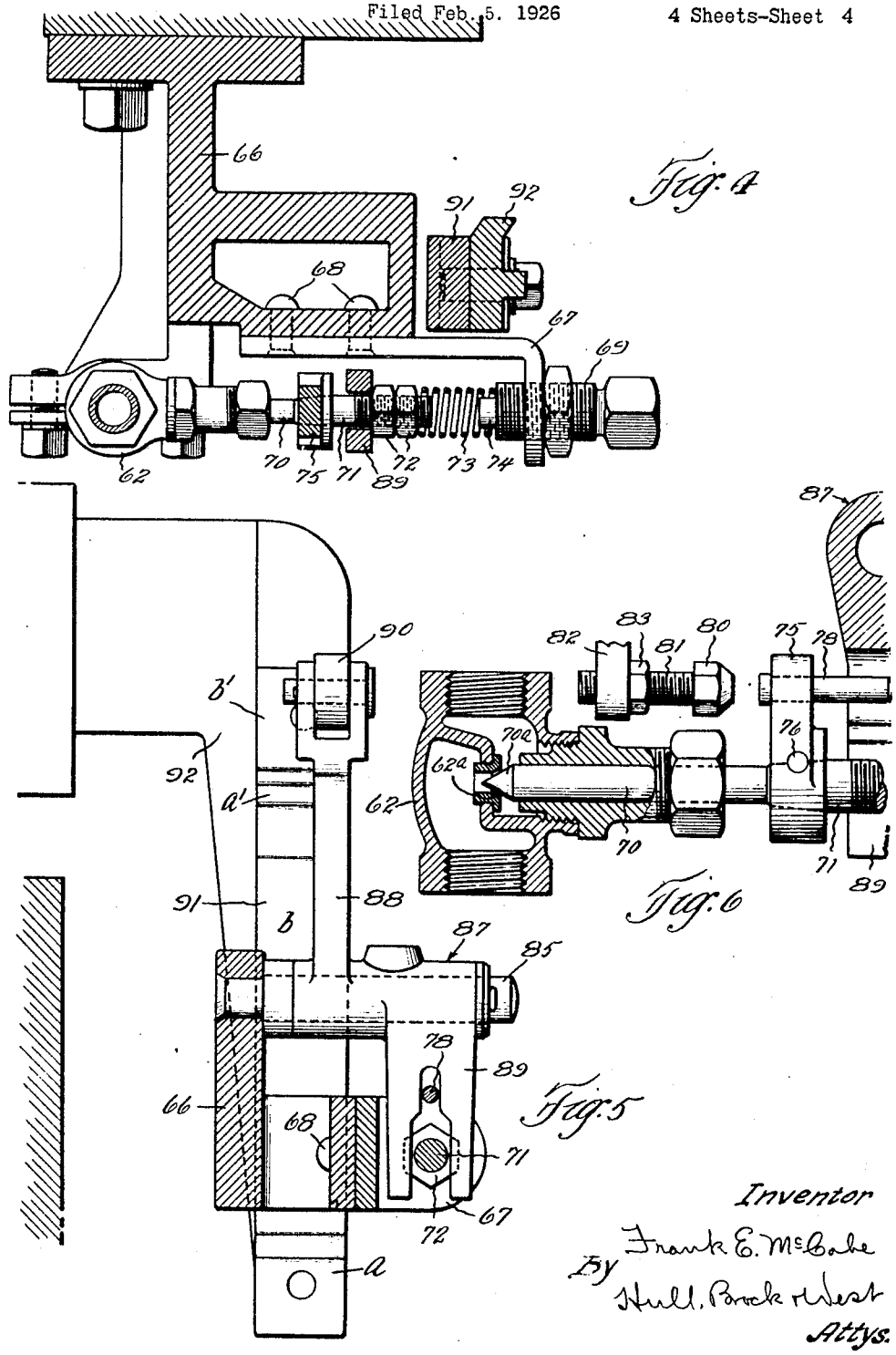

Patented Apr. 17, 1928.

1,666,578

UNITED STATES PATENT OFFICE.

FRANK E. McCABE, OF CHAGRIN FALLS, OHIO, ASSIGNOR TO THE RATHBONE MACHINE COMPANY, OF CLEVELAND, OHIO, A CORPORATION OF OHIO.

AUTOMATIC CONTROL FOR THE RAMMING HEADS OF MOLDING MACHINES.

Application filed February 5, 1926. Serial No. 86,147.

This invention relates to the class of molding machines disclosed in my co-pending application Serial No. 733,364, filed August 21, 1924, and it has to do more particularly with improved means for controlling the descent or return movement of the ramming heads of machines of this class.

The primary purpose of my present invention is to provide efficient and thoroughly reliable means for automatically controlling the retraction of the ramming head, effecting the very essential slow movement of said head while the patterns are being withdrawn from the molds and allowing a much faster movement thereof at all other times so as not to retard production.

Figure 1:
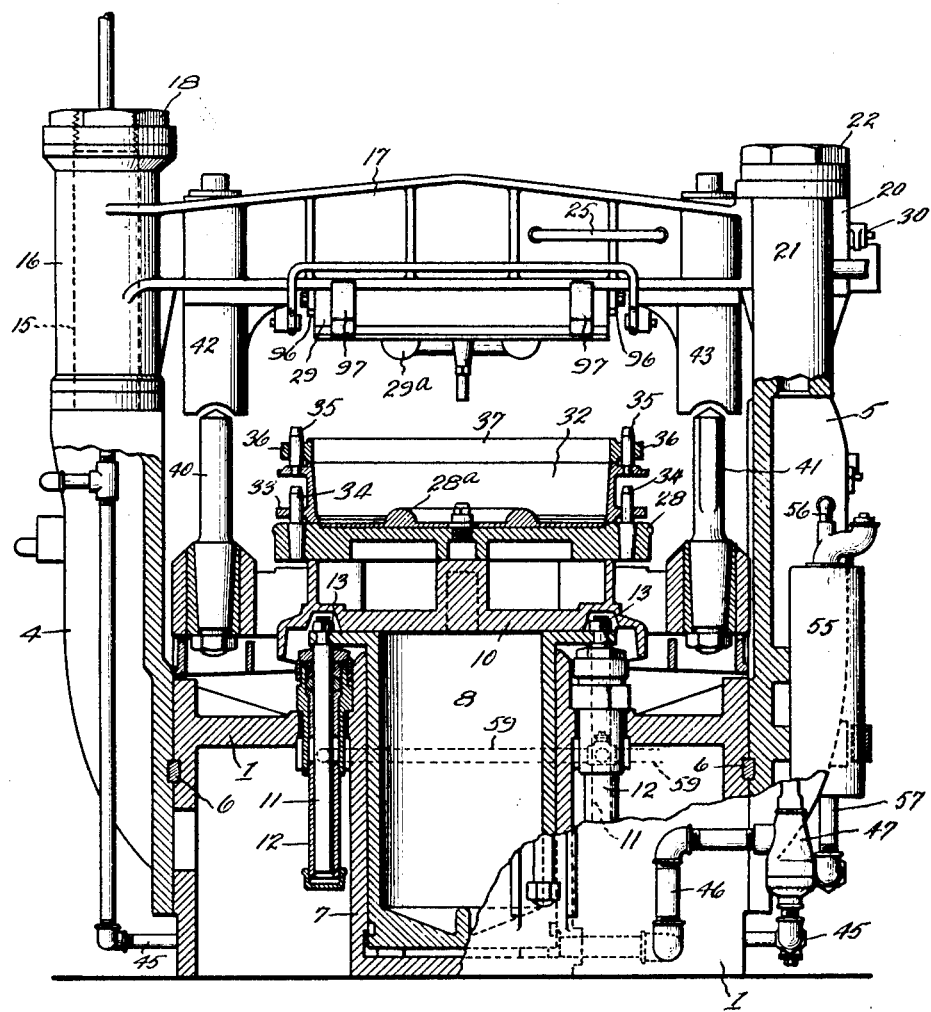
Figure 2:
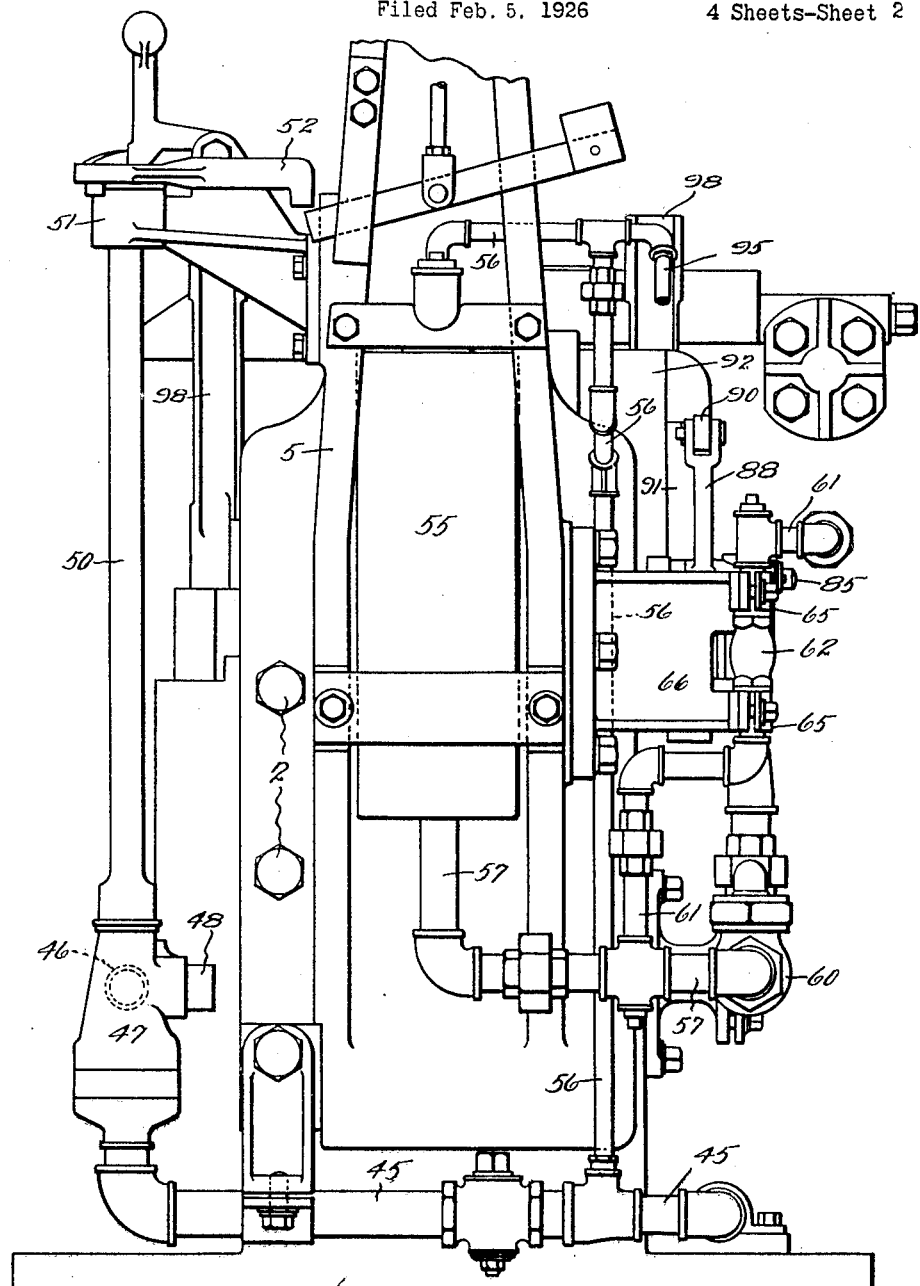
Figure 3:
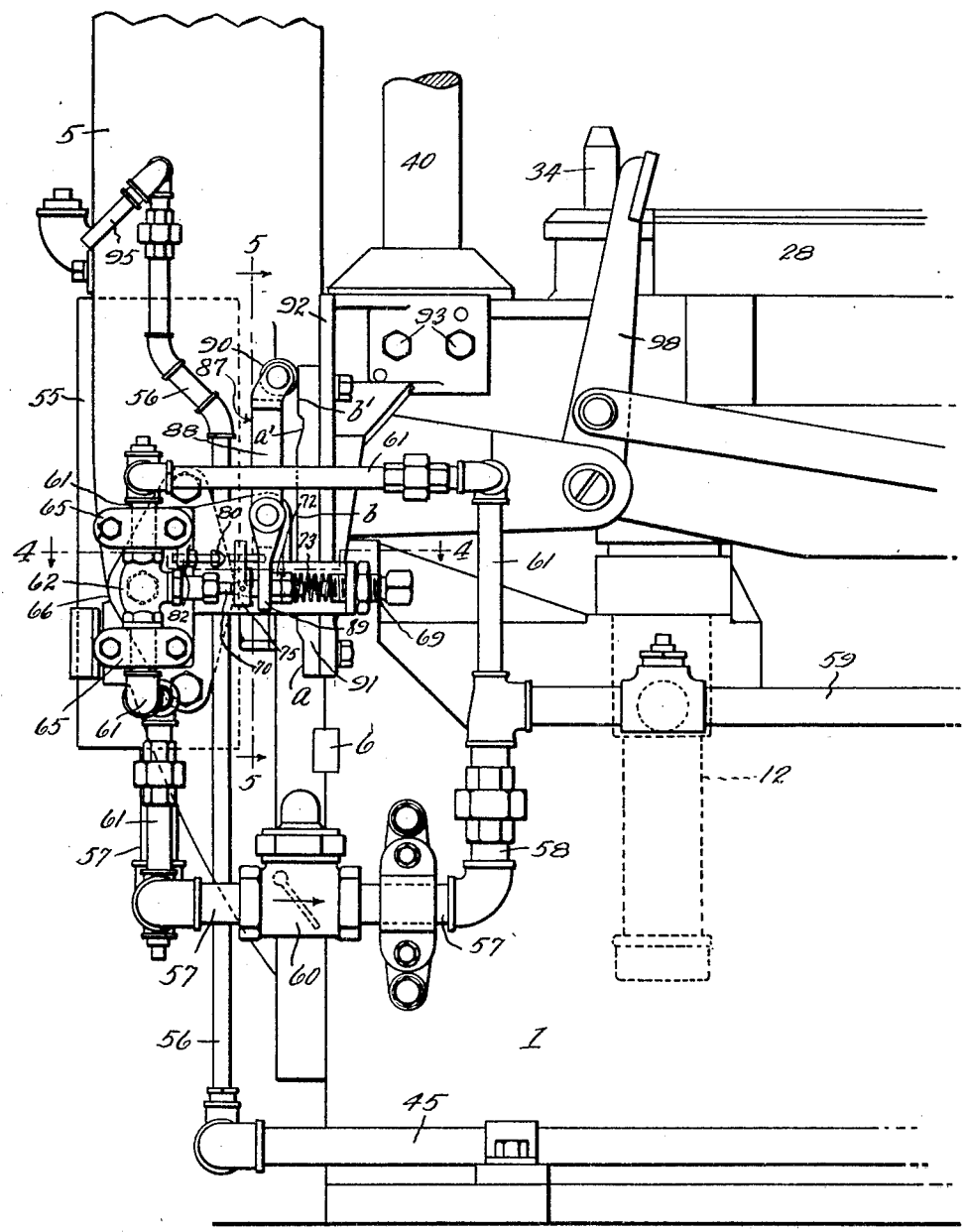

Other and more detailed objects of the invention will appear as this description proceeds, reference being had to the accompanying drawings wherein Fig. 1 is a sectional front elevation of a molding machine embodying my improvements; Fig. 2 is a fragmentary right hand end elevation of the machine on a considerably enlarged scale over that of Fig. 1; Fig. 3 is a similar rear elevation of the machine; Figs. 4 and 5 are enlarged sectional details on the respective lines 4—4 and 5—5 of Fig. 3; and Fig. 6 is a sectional detail, on a further enlarged scale, of the valve through which the descent of the ramming head is controlled.

The machine comprises, generally, a frame structure that is composed of a base 1 to the ends of which are secured, as by cap screws 2 (Fig. 2), vertical columns 4 and 5, the columns being accurately positioned with respect to the base, and maintained in such relation thereto, by keys 6 that occupy ways in the columns and base.

Operating within an upwardly opening cylinder 7 that is incorporated in the base 1 is a piston 8 to the flanged upper end of which is fastened a ramming head 10. The piston 8, and consequently the ramming head 10, are held against turning with respect to the base by plungers 11 that operate within dash pots 12 that are suitably supported within the base. The upper ends of the plungers are shown as reduced in diameter and extended through holes in the flange of the piston 8 beyond which they are threaded for the application of nuts 13. A further and more important function of the plungers and dash pots is to control the descent of the ramming head as will hereinafter more fully appear.

The lower portions of the columns 4 and 5 are preferably of channel formation while their upper ends are made cylindrical. The cylindrical upper end of the column 4 constitutes a bearing 15 upon which is journaled a sleeve 16 that is shown as formed integral with one end of a pressure head 17. The sleeve 16 is held down by a nut 18 that is screwed onto the upper threaded end of the bearing 15. The end of the pressure head 17 opposite the sleeve 16 is formed to provide a yoke 20 that is adapted to embrace the cylindrical portion 21 of the column 5, all of which is illustrated in greater detail in my above mentioned application. The free end of the pressure head—or that which incorporates the yoke 20—is adapted to be held down by a nut 22 that is screwed onto the reduced, threaded upper end of the column 5. A suitable latch 24 is employed to lock the pressure head to the column 5 in operative position with respect to the ramming head. The pressure head is equipped with a handle 25 by means of which it may be swung to and from operative position.

Secured, respectively, to the ramming head 10 and the pressure head 17 are pattern frames 28 and 29 and to these frames are attached the patterns 28ª and 29ⁿ, respectively. A mold flask 32 is adapted to be placed upon the pattern frame 28, and the same is provided with ears 33 which extend from its ends and have apertures which receive positioning pins 34 that rise from the pattern frame.

The flask, in turn, supports positioning pins 35 which cooperate with perforated ears 36 that extend from the ends of a sand frame 37 that is adapted to be applied to the top of the flask for a purpose which will presently appear.

To insure proper alignment of the cooperating parts which are carried by the respective heads, I employ pilot pins 40 and 41 which are supported by the ramming head 10 and are adapted to enter socket members 42 and 43 that are attached to the underside of the pressure head 17.

The machine is operated by pressure fluid, such as compressed air, that is conducted from a suitable source to the lower end of the cylinder 7 through pipes 45 and 46 that are adapted to be thrown into communication with each other through a valve 47. It may be explained that this is a three way valve and when in one position, cuts off communication between the aforesaid pipes; when in a second position, communicatively connects said pipes, and when in a third position, shuts off pipe 45 and opens pipe 46 to the atmosphere through an exhaust 48. The valve is adapted to be actuated by a stem 50 which rises to a height that is convenient to the operator and is journaled at its upper end in a bracket 51 that extends forwardly from the column 5. Above the bracket 51 the stem has secured to it an operating handle 52. As brought out in my previously mentioned application, this handle may have associated with it certain safety equipment which prevents the valve being placed in position to admit pressure fluid to the cylinder 7 except when the pressure head is in operative position.

I shall now proceed with a description of the means for controlling the descent of the ramming head and which constitutes the subject matter of my present invention. Suitably sustained within the lower, channel portion of the column 5 is an oil reservoir 55, and pressure fluid is conducted to the upper end of said reservoir through a branch 56 of the supply pipe 45. A pipe 57 leads from the lower end of the oil reservoir to a riser 58 which connects at its upper end with a horizontal pipe 59 that leads to the previously mentioned dash pots 12. A check valve 60 is placed within the pipe 57 immediately in advance of the riser 58 to prevent return flow from the dash pots to the reservoir through the course just described. The return of oil to the reservoir is permitted, however, through a pipe 61 which leads from the pipe 59 to a point in the pipe 57 in advance of the check valve 60. The pipe 61 includes a valve 62 which is preferably in the nature of a needle valve (Fig. 6).

The pipe 61, on opposite sides of the valve 62, is rigidly secured, as by clamps 65, to the outer end of a bracket 66 that is carried by and extends rearwardly from the column 5. An L-shaped arm 67 is fastened to the bracket 66, as by rivets 68 (Fig. 4) and a screw 69 is threaded through an end portion of the arm which is perpendicular to the axis of the stem 70 of the valve 62. Said stem is extended and enlarged, as shown at 71, and the enlarged portion is threaded for the application of nuts 72 which coact to lock each other in any adjusted position along the stem. A compression spring 73 is interposed between the outer one of the nuts 72 and the opposed end of the screw 69, said screw having an axial stud 74 which, with the end portion of the valve stem, serves to hold the spring in place. The spring 73 tends to project the stem of the valve in a direction to close the valve. A finger 75 is secured, as by means of a pin 76, to a tapered portion of the valve stem intermediate the portions 70 and 71 thereof, and a headed stud 78 is carried by the end of the finger. An adjustable abutment 80 is arranged to be engaged by the head of the stud 78, and the same is constituted of the head of a screw 81 that is threaded through a lug 82 of the bracket 66, the screw being provided with a nut 83 by means of which it may be locked in any adjusted position. The purpose of this adjustable abutment is to limit the distance that the tapered inner end 70ª of the valve stem may be projected toward the seat 62ª toward which it is advanced by the spring 73. In other words, by this adjustment is determined the minimum valve opening.

Mounted for oscillation upon a stub shaft 85 that projects rearwardly from a part of the bracket 66 is the hub portion of a rocker arm designated generally by the reference numeral 87 and including branches 88 and 89. The latter branch is bifurcated at its lower end and straddles the enlarged portion 71 of the valve stem. The valve stem is prevented from turning by the engagement of the stud 78 within the restricted upper end of the bifurcation of the branch 89 of the rocker arm. A roller 90 is carried by the upper end of the rocker arm branch 88, and the same is arranged to traverse the face of a cam 91 that is carried by a leg 92 which depends from the ramming head 10, said leg being shown as secured to said head by screws 93.

As previously stated, it is the mechanism which has just been described that is responsible for the automatic control of the descent of the ramming head and which effects a slow movement of said head while the patterns are being withdrawn from the mold cavities, and allows a relatively fast movement of the head at all other times. It will be seen by referring to Fig. 3, where the profile of the cam 91 is clearly shown, that the cam includes "low" parts a and a' adjacent its opposite ends and a relatively "high" part b between said "low" parts and a further "high" part b' above the "low" part a'. The purpose of this will be apparent from the following description of the operation of the machine.

In considering the operation, it may be assumed that the pressure head 17 is released from the column 5 and swung rearwardly out of the way and that the operator has, according to custom, by a suitable means, such as an air gun connected through a flexible hose to an extension 95 of the pipe branch that leads to the oil reservoir 55, blown or removed all sand from the pattern 28ª and has placed the flask 32 and the said frame 37 in position, as illustrated in Fig.

1. He then fills the flask and the sand frame with sand, scraping off any surplus to bring the top surface of the sand flush with the top of the sand frame 37. He then grasps the handle 25 and swings the pressure head into operative position above the ramming head, the latch 30 serving to lock the pressure head in place. The operator then grasps the handle 52 and turns the same to open the valve 47 and admit pressure fluid from the pipe 45 through the pipe 46 into the cylinder 7, whereupon the piston 8 and ramming head 10 will be elevated to carry the parts supported thereby into cooperation with the upper pattern 29ª, the pressure fluid accumulating within the cylinder to afford a powerful pressure to the piston thereby to effectively compress the sand within the flask. As the flask is presented to the top pattern 29ª, the sand frame 37 telescopes over the pattern frame until it is stopped, by abutments 96, with its lower edge flush with the surface of the pattern. The sand frame is held in elevated position by spring fingers 97 which are carried by the pattern frame 29.

As hereinbefore stated, the descent of the ramming head is governed by the dash pots 12. As the plungers 11 descend within the dash pots the oil in the dash pots is displaced and forced through the pipes 59, 61 and 57 to the reservoir 55. However, the oil can be displaced only as fast as the valve 62 will allow. When the ramming head is fully elevated, the roller 90 is opposite the "low" part $a$ of the cam 91 that is adjacent the lower end of said cam and, with the parts in this position, the valve 62 is as nearly closed as the engagement of the head of the stud 78 with the abutment 80 will permit. This is because of the fact that when the roller 90 drops into the "low" part $a$ it permits the rocker arm 87 to turn on the stub shaft 85, the lower branch 89 of said arm swinging toward the valve 62 so as to permit the spring 73 to project the valve stem inwardly. Consequently the initial downward movement of the ramming head is retarded at the time the mold is being stripped from the upper pattern 29ª. Immediately after this the roller 90 rides upon the "high" part $b$ of the cam 91 and this results in the valve 62 being open to quite a considerable extent because it swings the rocker arm in a direction to move the branch 89 thereof away from the valve 62, thereby to retract the valve stem by reason of the engagement of said branch with the adjacent nut 72, whereupon the oil flows comparatively freely from the dash pots to the reservoir allowing the ramming head to descend rapidly until the roller 90 swings over to the "low" part $a'$ adjacent the upper end of the cam. This causes the valve 92 to resume its former condition and, as a consequence thereof, the movement of the ramming head is again retarded. This occurs at about the time the flask 32 engages the upper ends of flask arresting and sustaining means 98 (Fig. 3) and continues until the lower pattern is withdrawn from the mold. The flask arresting and sustaining means, involving the arms 98, constitutes no part of my present invention and accordingly a detailed illustration thereof is deemed unnecessary. This mechanism is fully disclosed in my copending application hereinbefore referred to. Just as soon as the lower pattern is clear of the mold the roller 90 rides onto the high part $b'$ of the cam 91 and the rocker arm is swung in a direction to retract the valve stem and open the valve so as to permit free passage of the oil therethrough and consequently causes a rapid descent of the ramming head to its lowest position.

Thus it will be seen that, through my present invention, the descent of the ramming head is automatically controlled in such a way as to greatly expedite the production of molds and insure uniform and perfect work, removing the human element completely from the operation. Furthermore, by the adjustment of the valve limiting abutment the mechanism may be regulated to suit different conditions and to compensate for any variations in the viscosity of the oil resulting from temperature changes. Also, it should be explained that various shaped cams 91 may be provided to suit flasks and patterns of different depths. Not only can the "slow" periods of the descent of the cam be varied by the adjustment of the abutment 80, but the "fast" periods as well may be regulated by the adjustment of the nuts 72.

Having thus described my invention, what I claim is:

1. In a molding machine, the combination of opposed heads that are relatively movable toward and from each other, means for effecting relative movement of the heads, a fluid container, a fluid displacing element operating in said container, said container and said displacing element being connected to the respective heads in such manner that the container and displacing element are restricted to substantially the same relative movement as the heads, a valve for controlling the escape of fluid from the container, said valve incorporating an orifice and a closure that is movable toward and from the orifice, and means dependent for its actuation upon the relative movement between the heads for automatically adjusting the closure toward and from said orifice thereby to effect a movement of variable speed between the heads.

2. In a molding machine, the combination of a pressure head, a ramming head supported for movement toward and from the pressure head, means for moving the ramming head, a fluid container supported in fixed relation to one of said heads, a fluid displacing element operating in said container and carried by the other head, a valve for controlling the escape of fluid from the container, said valve incorporating an orifice and a closure movable toward and from said orifice, and means dependent for its actuation upon the relative movement between the heads for automatically adjusting the closure toward and from the orifice to effect a variable speed of the ramming head.

3. In a molding machine, the combination of a pressure head, a ramming head supported for vertical movement toward and from the pressure head, means for elevating the ramming head, a dash pot for controlling the descent of the ramming head, a valve for governing the escape of fluid from the dash pot, said valve incorporating an orifice and a closure movable toward and from the orifice, and means carried by the ramming head for automatically moving the closure toward and from the orifice thereby to effect a variable speed of the ramming head.

4. In a molding machine, the combination of opposed heads that are relatively movable toward and from each other, means for effecting relative movement between the heads, a dash pot for controlling relative movement between the heads in a direction away from each other, a valve for governing the escape of fluid from the dash pot, said valve incorporating an orifice and a closure that is movable toward and from the orifice, means tending to move the closure toward the orifice, and means dependent for its actuation upon the relative movement between the heads for automatically adjusting the closure in opposition to the last mentioned means thereby to effect relative movement of variable speed between the heads in a direction away from each other.

5. In a molding machine, the combination of opposed heads that are relatively movable toward and from each other, means for effecting relative movement of the heads, a dash pot for controlling relative movement between the heads in a direction away from each other, a valve for governing the escape of fluid from the dash pot, said valve incorporating an orifice and a closure movable toward and from the orifice, means tending to move the closure toward the orifice, an adjustable stop for limiting the movement of the closure in a direction toward the orifice, and means dependent for its actuation upon the relative movement between the heads for automatically adjusting the closure in opposition to the last mentioned means thereby to effect relative movement of variable speed between the heads in a direction away from each other.

6. In a molding machine, the combination of a pressure head, a ramming head supported for vertical movement toward and from the pressure head, means for moving the ramming head towards the pressure head, a dash pot for controlling the movement of the ramming head away from the pressure head, a valve for governing the escape of fluid from the dash pot, said valve incorporating an orifice and a closure that is movable toward and from said orifice, a spring tending to move the closure toward the orifice, a rocker arm for moving the closure in opposition to said spring, and means carried by the ramming head for swinging the rocker arm thereby to control the movement of the closure and effect a variable speed of the ramming head.

7. In a molding machine, the combination of a pressure head, a ramming head supported by vertical movement toward and from the pressure head, means for elevating the ramming head, a dash pot for controlling the descent of the ramming head, a valve for governing the escape of fluid from the dash pot, said valve incorporating an orifice and a closure that is movable toward and from the orifice, a rocker arm for moving the closure, and a cam carried by the ramming head for rocking said arm.

8. In a molding machine, the combination of a pressure head, a ramming head supported by vertical movement toward and from the pressure head, means for elevating the ramming head, a dash pot for controlling the descent of the ramming head, a valve for governing the escape of fluid from the dash pot, said valve incorporating an orifice and a closure that is movable toward and from the orifice, a spring tending to move the closure toward the orifice, a rocker arm for moving the closure in opposition to said spring, and a cam carried by the ramming head for rocking said arm.

9. In a molding machine, the combination of a base, a pressure head fixed with respect to the base, a ramming head supported by the base for vertical movement toward and from the pressure head, means for elevating the ramming head, a dash pot for controlling the descent of the ramming head, a valve for governing the escape of fluid from the dash pot, said valve incorporating an orifice and a closure that is movable toward and from the orifice, a spring tending to move the closure toward the orifice, a cam carried by the ramming head, and a member arranged to be engaged and moved by the cam for moving the closure in opposition to said spring.

10. In a molding machine, the combination of a base, a pressure head fixed with respect to the base, a ramming head supported by the base for vertical movement toward and from the pressure head, means for elevating the ramming head, a dash pot for controlling the descent of the ramming head, a valve for governing the escape of fluid from the dash pot, said valve incorporating an orifice and a closure that is movable toward and from the orifice, a cam carried by the ramming head, and a member arranged to be engaged and moved by the cam for moving the closure.

11. In a molding machine, the combination of a base, a pressure head fixed with respect to the base, a ramming head supported by the base for vertical movement toward and from the pressure head, means for elevating the ramming head, a dash pot for controlling the descent of the ramming head, a valve for governing the escape of fluid from the dash pot, said valve incorporating an orifice and a closure that is movable toward and from the orifice, a spring tending to move the closure toward the orifice, a cam carried by the ramming head, a member arranged to be engaged and moved by the cam for moving the closure in opposition to said spring, and adjustable connections between said member and the closure.

12. In a molding machine, the combination of a base, a pressure head supported above the base, a ramming head supported by the base for vertical movement toward and from the pressure head, means for elevating the ramming head, dash pots for controlling the descent of the pressure head, a liquid reservoir, means for conducting pressure fluid to the reservoir for the purpose of displacing the liquid therein, communicative connections between the reservoir and the dash pots, said connections including a check valve for preventing the return of liquid through said connections, other connections through which the liquid may escape from the dash pots and return to the reservoir, a valve in the last mentioned connections, said valve incorporating an orifice and a closure movable toward and from the orifice, and means carried by the ramming head for automatically adjusting the closure toward and from the orifice thereby to effect a variable speed of the ramming head.

13. In a molding machine, the combination of a base, a pressure head supported above the base, a ramming head sustained by the base for vertical movement toward and from the pressure head, means for elevating the ramming head, a dash pot for controlling the descent of the ramming head, a valve for governing the escape of fluid from the dash pot, said valve incorporating an orifice and a closure that is movable toward and from the orifice, the closure having an extension, an abutment on said extension, a spring tending to move the closure toward the orifice, a rocker arm supported by the base in a position to engage said abutment, and a cam carried by the ramming head for cooperation with said arm thereby to rock the arm and adjust the closure in opposition to the aforesaid spring.

14. In a molding machine, the combination of a base, a pressure head supported above the base, a ramming head sustained by the base for vertical movement toward and from the pressure head, means for elevating the ramming head, a dash pot for controlling the descent of the ramming head, a valve for governing the escape of fluid from the dash pot, said valve incorporating a seat, and a stem that is reciprocable toward and from the seat, the end of the stem adjacent the seat being designed for cooperation therewith, an abutment adjustably supported by the base in opposed relation to the valve stem, a spring interposed between the abutment and said stem for moving the latter toward the valve seat, a stop adjustably carried by the base for limiting the movement of the stem in the latter direction, an abutment on the valve stem, a member supported by the base for oscillation and in a position to engage the abutment on the valve stem, and a cam carried by the ramming head for engagement with said member thereby to oscillate it and move the valve stem in opposition to the aforesaid spring.

15. In a molding machine, the combination of a base, a pressure head supported above the base, a ramming head sustained by the base for vertical movement toward and from the pressure head, means for elevating the ramming head, a dash pot for controlling the descent of the ramming head, a valve for governing the escape of fluid from the dash pot, said valve incorporating a seat, and a stem that is reciprocable toward and from the seat, the end of the stem adjacent the seat being designed for cooperation therewith, an abutment adjustably supported by the base in opposed relation to the valve stem, a spring interposed between the abutment and said stem for moving the latter toward the valve seat, a stop adjustably carried by the base for limiting the movement of the stem in the latter direction, an abutment adjustable on the valve stem, a rocker arm supported by the base and having one of its ends bifurcated and embracing the valve stem adjacent the abutment thereon, and a cam carried by the ramming head for cooperation with the rocker arm.

In testimony whereof, I hereunto affix my signature.

FRANK E. McCABE.